United States Patent Office 3,442,387
Patented May 6, 1969

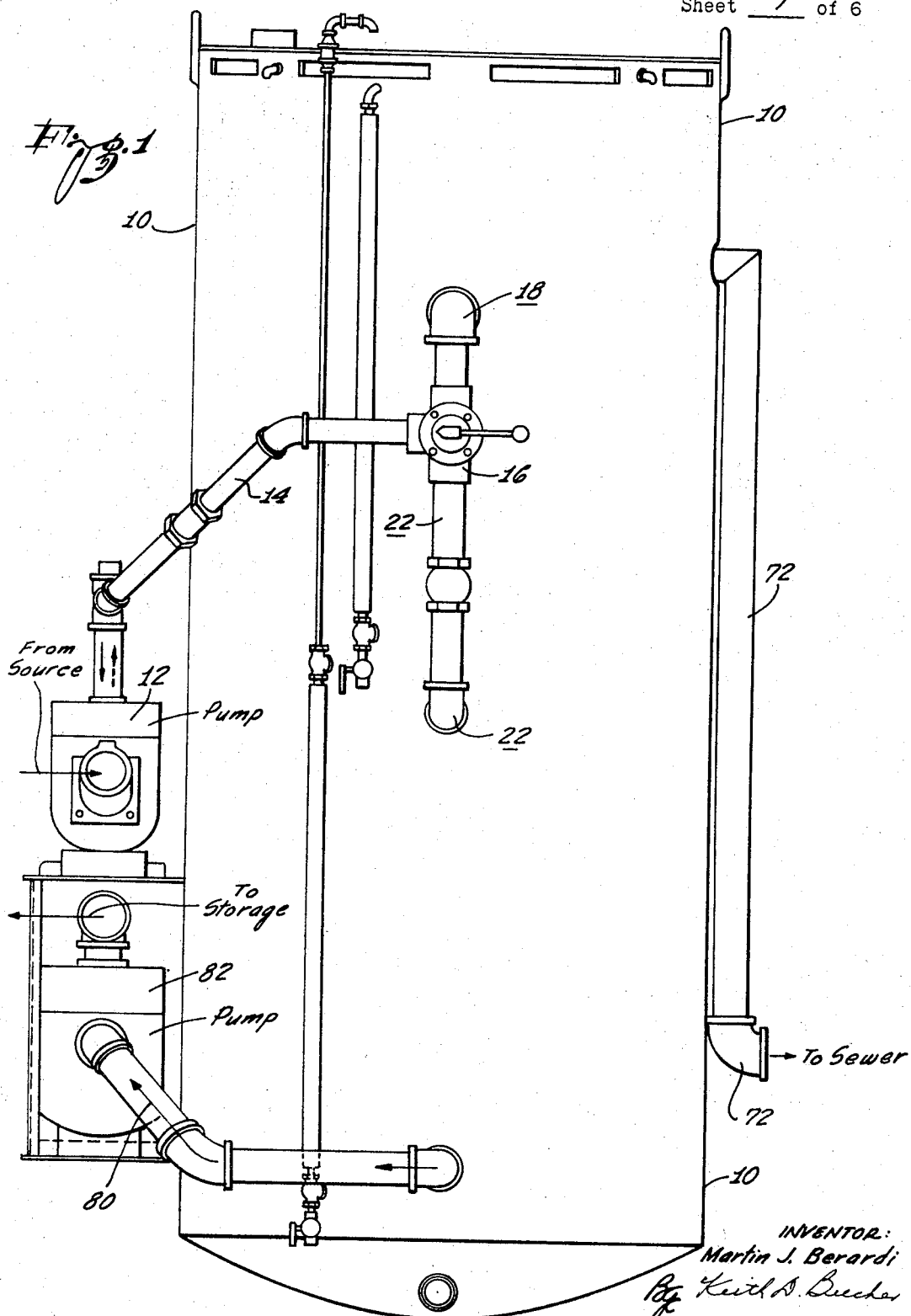

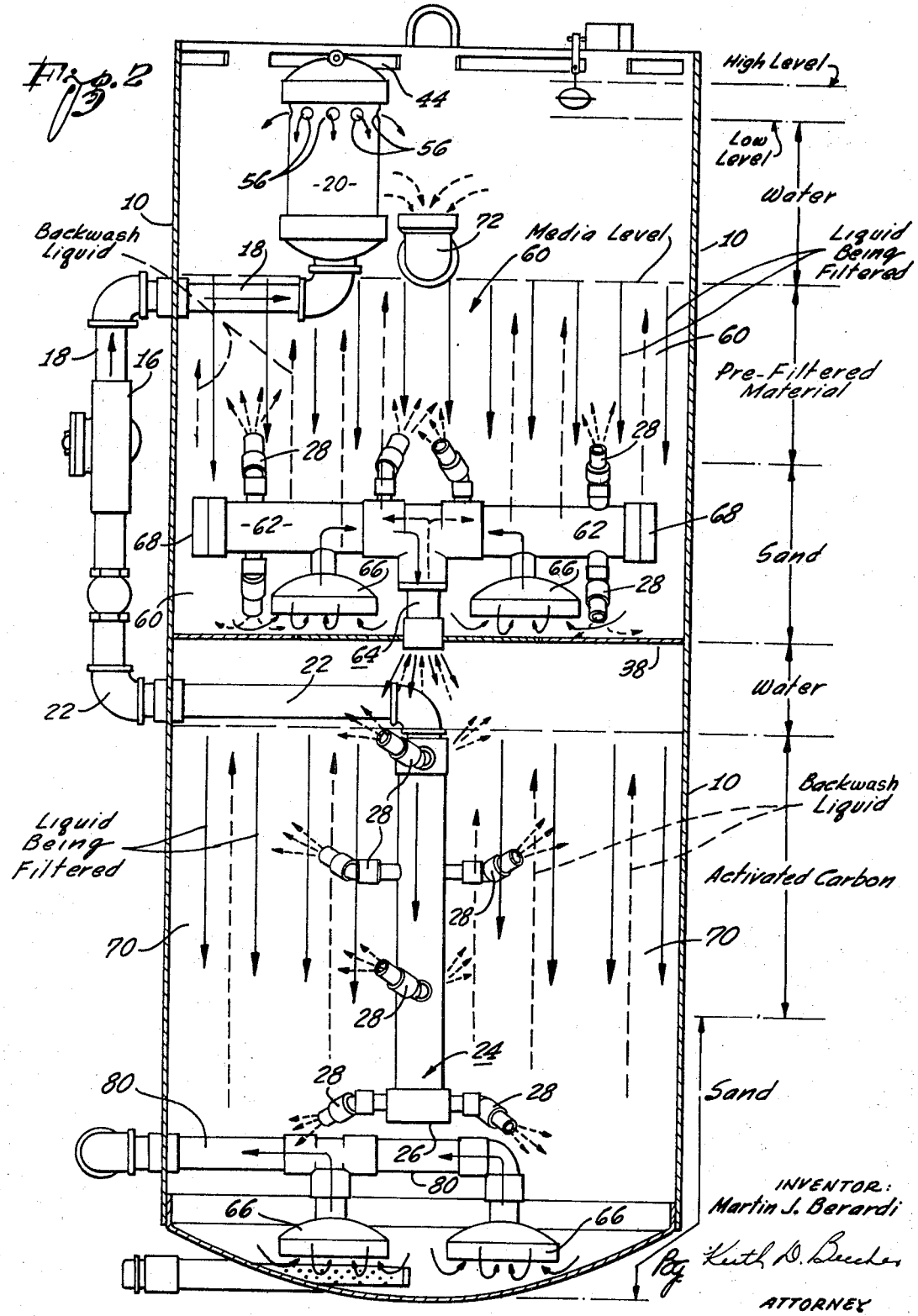

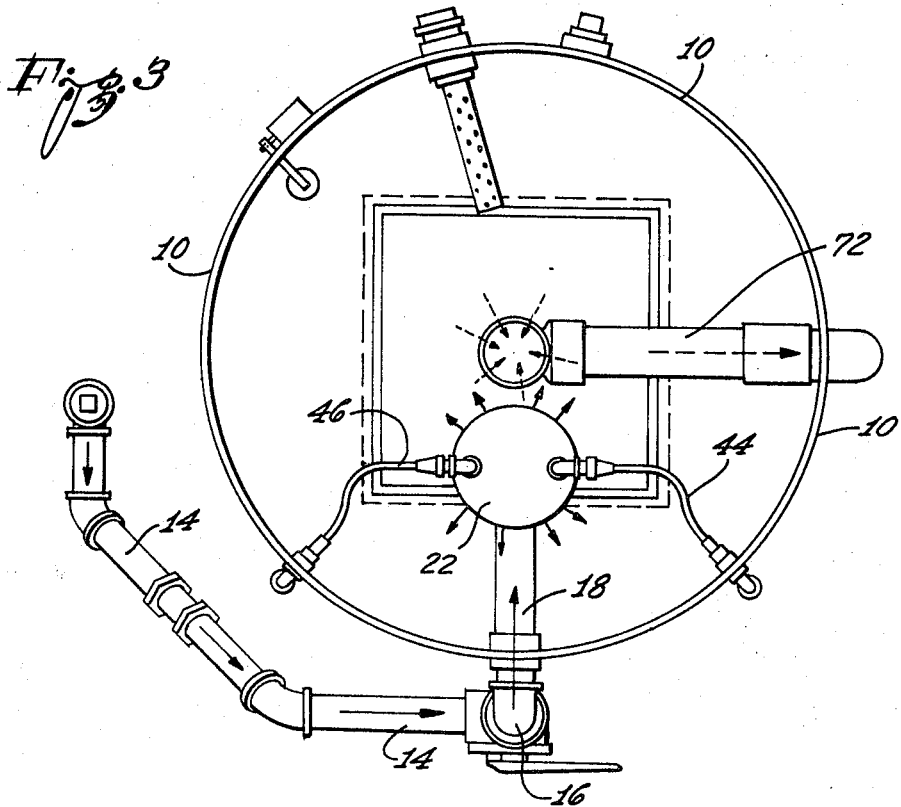
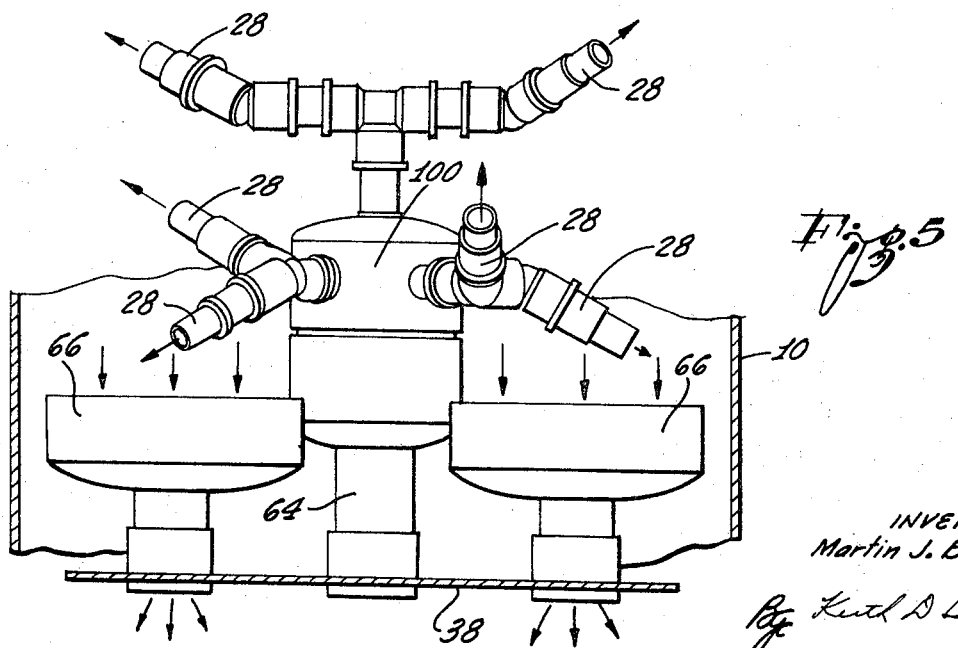

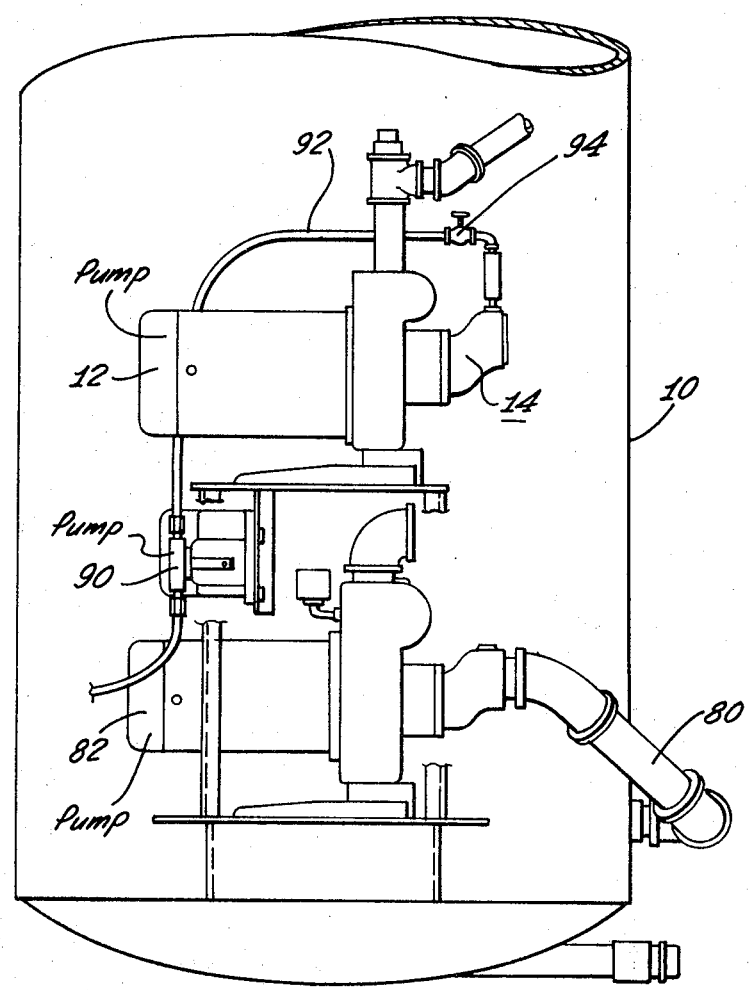

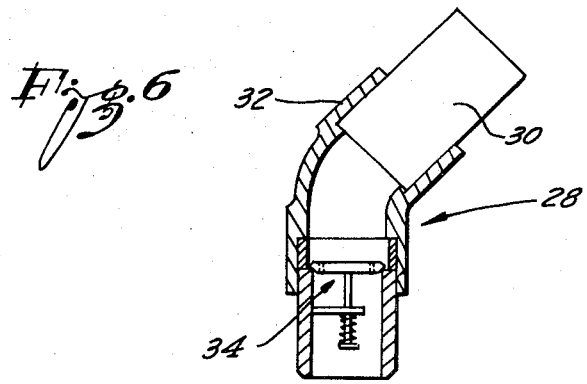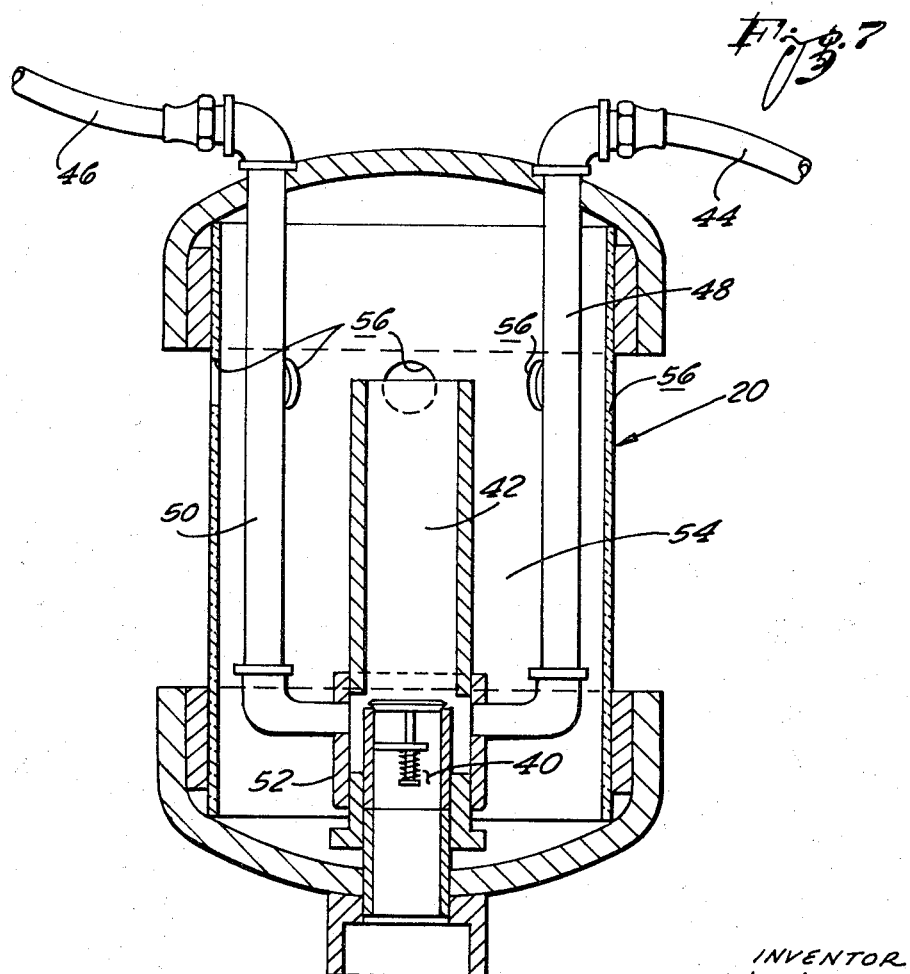

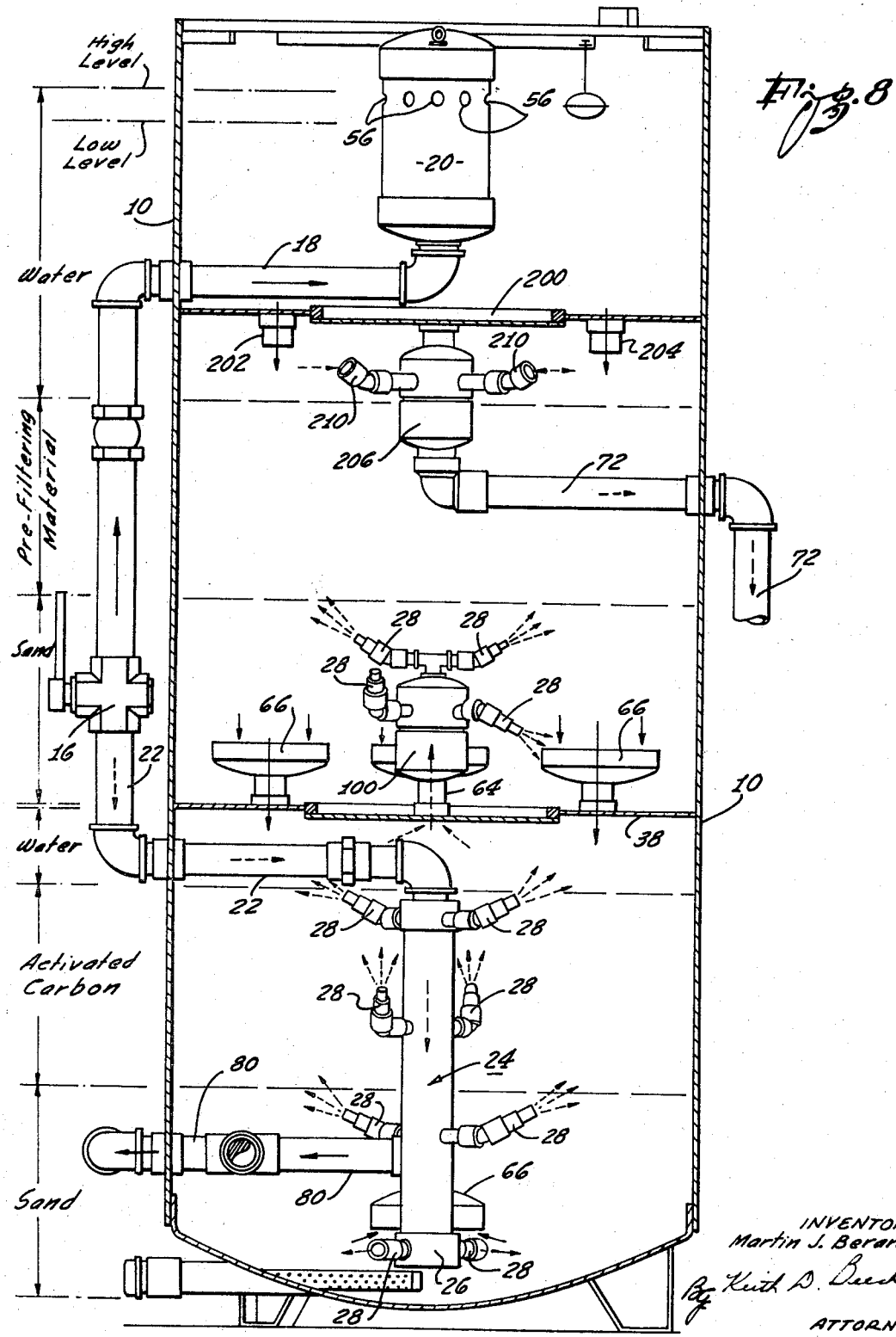

3,442,387
FILTERING APPARATUS
Martin Joseph Berardi, 149 NE. 98th St.,
Miami Shores, Fla. 33153
Filed June 26, 1967, Ser. No. 648,696
Int. Cl. B01d 23/28, 23/24; C02b 1/28
U.S. Cl. 210—203         5 Claims

ABSTRACT OF THE DISCLOSURE

An improved apparatus for purifying a liquid is described which includes aerating, precipitating and coagulating means for taking certain dissolved chemicals out of solution so that they may be subsequently filtered in the filter beds of the apparatus, and which includes means for rapidly and efficiently backwashing the filter beds.

BACKGROUND OF THE INVENTION

The prevalence of stream and river contamination has made the requirement for effective filtering of waste liquids most pressing today. In addition, in locations of water shortage, it is most desirable that adequate filtering of existing water supplies be provided in order to permit the efficient re-use of the water. This, of course, applies to any operation in which water wastage may be avoided by recirculating the water used in the system and providing adequate filtration in the recirculation path.

The problems of providing adequate filtering apparatus, however, have long impeded progress in this art. For example, the prime objective of such filtering apparatus is to remove all the impurities from the liquid, and to achieve this on an economical basis with large volumes of liquid and without excessive space requirements.

Another problem is that of removing impurities which are dissolved in the water, and which are not easily filtered out by the usual mechanical filter beds. Yet another problem is that of providing a simple and efficient means for periodically washing out the filter beds by a backwash operation, as the filter beds become clogged with foreign matter.

The improved apparatus of the present invention is constructed to solve the problems outlined in the previous paragraph, and to provide a commercially feasible, efficient filter apparatus which is capable of throughly filtering impurities out of a contaminated liquid so as to purify the liquid.

As will be described, the improved filter apparatus of the invention includes a means for aerating the liquid and thereby coagulating impurities which are normally dissolved in the liquid, so that such impurities can be readily filtered out by the mechanical filter bed in the apparatus.

The apparatus of the invention is constructed to handle tremendous volumes of the incoming liquid, and to provide a rapid and complete filtration therefor. In addition, rapid backwashing means is provided so that the mechanical filter beds in the apparatus may be periodically washed out.

The apparatus to be described is relatively simple and economical to construct, and it is rugged in its construction and compact insofar as its space requirements are concerned. The apparatus of the invention operates with a high degree of efficiency, and it is flexible insofar as its site of operation is concerned. The apparatus, for example, does not depend upon external water pressure and can be used in rural areas where there are no high pressure water mains.

BRIEF DESCRIPTION OF THE DRAWINGS

FIGURE 1 is a side elevation of one embodiment of the apparatus; showing the single tank in which the apparatus is housed, and the various pumps, valves and conduits associated therewith;

FIGURE 2 is a vertical section of the apparatus of FIGURE 1, turned 90° with respect to the representation of FIGURE 1;

FIGURE 3 is a top view of the apparatus;

FIGURE 4 is a partial elevation turned 90° with respect to FIGURE 1, but in the opposite direction as compared with the section of FIGURE 2;

FIGURE 5 is a fragmentary section showing a modification of the invention;

FIGURE 6 is a section of a backwash nozzle of the type used in the apparatus, and showing a check valve construction which is used in the nozzle;

FIGURE 7 is a vertical section of an aerating unit used in the apparatus; and

FIGURE 8 is a vertical section, like FIGURES 2 and 5, of a modification of the invention.

DESCRIPTION OF ILLUSTRATED EMBODIMENTS

As will be described, the illustrated embodiments of the invention are a single tank filtering apparatus, which incorporates in a simple and compact assembly, a chemical coagulation and precipitation means and aeration unit, and prefiltration and final filtration of the liquid to be treated.

Through precipitation, coagulation, and the use of proper chemicals, the aeration unit, for example, takes iron, manganese, sulphite, ABS, phenol, phosphates, and many other chemical pollutants out of the solution and places them in suspension in the incoming liquids, therefore causing these pollutants to coagulate so that they may be easily removed by the mechanical filter bed. To assist in the precipitation and coagulation of the aforesaid elements, chlorine, potassium permanganate, sodium hypochloride, Onyx Chemical BTC 776, or other suitable coagulating chemicals may be blended into the incoming liquid.

The aerator unit incorporated into the apparatus of the invention also serves to dissipate any detergent which might be in the liquid, so that the detergent may be easily removed by the mechanical filter, and adds oxygen to the liquid for additional purification.

The apparatus to be described is constructed so that the incoming liquid may be used for the backwash operation; and there is no dependence on city water supplies, or high pressure water mains. The mechanical filter beds of the apparatus to be described can be backwashed in a matter of minutes, and with approximately 75% less liquid waste than with the usual prior art filtering apparatus of the same general type.

The apparatus to be described is a semi-gravity type in which the liquid to be purified is pumped into the top of the tank and allowed to settle down through a series of mechanical filter beds. The filtered liquid is then pumped out the bottom of the tank, so that a suction is created on the liquid at the bottom of the tank. The system, for example, is an open tank type of system, in that it does not depend upon creating pressures within a closed tank.

The filtering apparatus of the illustrated embodiment, as shown particularly in FIGURES 1-3, for example, include a tank 10. This tank may have a usual cylindrical configuration with a bottom and an upstanding vertical side wall.

The incoming liquid to be filtered is pumped by a pump 12 through a first conduit 14 to a manually operated two-way valve 16. When the valve 16 is set to the illustrated position in FIGURE 1, the incoming liquid is passed through the valve to a further conduit 18 which extends into the tank 10, and, as shown in FIGURE 2, into the bottom of an aerator unit 20.

On the other hand, when the two-way valve 16 is set to a second position, the incoming liquid is diverted through a conduit 22 into the lower portion of the tank 10, and, as shown, into a vertical apertured conduit 24. The apertured conduit 24 extends vertically, and the lower end is closed by a cap 26. A plurality of backwash nozzles 28 are mounted in the various apertures in the conduit 24, and are disposed so that the liquid introduced to the conduit 24, as diverted by the valve 16, is emitted from the backwash nozzles 28 in the form of a series of turbulent sprays.

Each of the nozzles 28 may have the form shown in FIGURE 6. That is, each nozzle 28 may include a nipple 30 which is supported in a 45° elbow 32, the liquid being introduced through the elbow to the nipple by way of a spring loaded check valve 34. The purpose of the check valve is to prevent any of the liquid passing down through the tank from entering into the conduit 24 by way of the nozzles 28.

The lower portion of the tank, which includes the vertically disposed apertured conduits 24, is separated from the upper portion by means, for example, of a partition 38. This partition extends across the tank and is impervious, except for a central aperture.

The conduits and other fittings in the apparatus may conveniently be formed of polyvinyl chloride (PVC), since such material is easy to machine and shape, and is well suited for the intended purpose.

The incoming liquid, entering the aerator 20, as best shown in FIGURE 7 passes through a check valve 40. The purpose of the check valve is to prevent liquid from entering the conduit 18 by way of the aerator 20. The check valve also causes the incoming liquid to assume a hollow cylindrical shaped stream. The liquid entering the aerator 20 is passed through an interior tubular conduit fitting 42. At the same time, air is drawn into the aerator through a pair of air hosess 44 and 46 by the venturi action of the liquid passing through check valve 40 and conduit 42. The air passes down a corresponding pair of air pipes 48 and 50 within the aerator unit and through a tubular fitting 52 into a chamber surrounding the check valve 40 where the suction produced by the liquid causes the air to be drawn into the conduit 42 and mixed with the liquid.

The air is thereby turbulently mixed with the incoming liquid, as the air and liquid pass up through the tubular fitting 42. The resulting aerated liquid fills the chamber 54 of the aerator 20 which, preferably, is transparent for inspection purposes, and passes out through a series of apertures 56. The aerated liquid from the apertures 56 of the aerator passes down by gravity through a first filter bed 60.

This first filter bed may, for example, be a pre-filtering means for removing the larger foreign objects from the liquid. It may be composed, for example, of a layer of sand supported by the retainer 38, and a further layer of appropriate pre-filtering material supported on the sand, so as to fill the tank up to the illustrated level. The space above the upper level of filter material in the tank is filled with liquid, as the water is emitted from the openings 56 in the aerator 20. The liquid then seeps down through the layers of the first filter bed 60, as shown by the solid arrows.

An apertured conduit 62 is imbedded in the first filter bed 60. As shown, this conduit 62 is supported along a horizontal axis by means, for example, of a further conduit 64 which is coupled as a T into the conduit 62. The conduit 64 extends through the central opening in the partition 38. A plurality of strainer units 66 are mounted on a corresponding plurality of inlets in the conduit 62, so that the liquid filtered down through the first filter bed 60 is caused to pass through the strainer units 66 and into the interior of the conduit 62.

Appropriate end caps 68 are provided which close off the ends of the conduit 62, so that the liquid passing into its interior through the strainer 66 is caused to pass down through the conduit 64 and through the partition 38 to the lower part of the tank 10. A second filter bed 70 is supported, for example, in the lower part of the tank. This second filter bed may, for example, include a layer of sand at the bottom of the tank, and a further layer of activated carbon on top of the layer of sand. The second filter bed 70 surrounds the vertical conduit 24 described above, so that the vertical conduit is imbedded in the layers of the second filter bed.

A plurality of the backwash nozzles 28 are also mounted in apertures in the conduit 62. When the nozzles 28 described above in conjunction with the vertical conduit 24 are caused to emit backwash liquid, the liquid flows up under pressure through the conduit 64 into the interior of the conduit 62.

Appropriate check valves are provided in the strainer unit 66, so that the backwash liquid in the conduit 62 is caused to be discharged under pressure through the backwash nozzles 28 associated with the latter conduit. These latter nozzles are directed so that the backwash liquid emitted therefrom may be directed in a turbulent manner throughout the upper filter bed 60. The resulting backwash liquid is caused to fill the upper part of the tank of FIGURE 2, and it passes out a drain 72 to an appropriate sewer, or other disposal means. A valve (not shown) is provided in the drain 72, so that the line will be closed during the normal operation of the filter. The check valve 40 (FIGURE 7) in the aerator unit 20 serves to prevent any of the backwash liquid from entering the conduit 18 back through the aerator 20.

A discharge conduit 80 is provided at the bottom of the tank 10, and this conduit extends into a second pump 82. The pump 82 sucks the filtered liquid from the bottom of the tank, and pumps it an appropriate storage means (not shown). The strainer units 66 are also mounted on the conduit 80, so as to provide a secondary straining action for the filtered liquid as it is removed from the tank.

As shown in FIGURE 4, a coagulating chemical such as chlorine, may be introduced into the incoming fluid in the conduit 14. This is achieved by pumping the chemical from an appropriate source (not shown) by means of a pump 90 through appropriate tubing 92 and a valve 94 into the conduit 14.

In the modification shown in FIGURE 5, the strainer units 66 are mounted directly on the partition 38, so that the liquid being filtered passes through the strainer unit and through the partition. Then, during the backwash operation, the backwash liquid from below the partition 38 is forced up through the conduit 64 into the interior of a chamber 100. The chamber 100 is coupled to a plurality of the backwash nozzles 28 through appropriate conduits, as shown. The chamber 100 and its associated backwash nozzles 28, like the conduit 62 of FIGURE 2, are imbedded in the first filter bed 60. The nozzles 28 are positioned to direct the backwash liquid in different directions in the filter bed for rapid and efficient backwashing of the bed. The check valves in the strainer units 66 prevent the backwash liquid from passing through the strainers To recapitulate on the operation of the filter unit, it will be appreciated that when the valve 16 is set to normal operation, the pump 12 draws the liquid to be filtered from its source, and pumps it under pressure into the aerator 20 at the top of the tank. A suitable coagulating chemical may be blended with the incoming liquid by means of the pump 90 in FIGURE 4. The liquid is mixed with pressurized air in the aerator 20 as described, for example, in conjunction with FIGURE 7. The aerated liquid leaving the aerator is then caused to fill the upper part of the tank 10, and it passes down under the force of gravity through the first filter bed, and through the strainer units 66 into the interior of the conduit 62. The first filter bed, as explained, serves as a pre-filter for removing the coarser impurities from the liquid. The liquid from the conduit 62 then passes through the conduit 64 and through the partition 38 to the lower part of the tank, and, by gravity, through the lower filter bed (as also shown by the solid arrows), where complete filtration is carried out. The resulting filtered liquid is sucked by the discharge pump 82 through the strainers 66 and into the conduit 80, and is sent to storage.

Periodically, it is desirable to backwash the top and bottom filter beds. This is conveniently accomplished, merely by setting the valve 16 to the backwash position. Then, the incoming liquid is diverted through the conduit 22 and into the vertical conduit 24 in the lower filter bed. The pressure from the pump 12 is high enough so that the backwash liquid is emitted with high pressure and high turbulence from the nozzles 28. This causes the lower filter bed to be quickly agitated and the foreign material in the bed to be driven up through the conduit 64 into the conduit 62, as shown by the dashed line arrows. Sufficient pressure is built up in the lower part of the tank, so that the backwash liquid is emitted with high pressure through the nozzles 28 associated with the conduit 62 in the upper part of the tank. This causes agitation and cleaning of the upper filter bed, with the backwash liquid passing up through the upper part, as also shown by the dashed line arrows, and out of the system through the drain 72.

As mentioned above, during the backwash operation, the check valves in the strainer units 66 and in the aerator 20 assures that the backwash liquid will follow the desired backwash path as described above. Likewise, during normal operation of the filter apparatus, the check valves in the nozzles 28 assure that the liquid will follow the desired filtering paths, and will not be introduced into the backwash components.

It has been found that backwashing can be accomplished in a matter of minutes, and this is achieved merely by setting the two-way valve 16 to the backwash position. As noted above, the filter apparatus is compact, and provides for a multiple filtration of the liquid, together with an aeration and coagulation thereof, all within the confines of a single tank. The system, incorporating as it does its own pumping units, does not depend upon city water pressures, and is capable in and of itself for providing adequate pressures for the proper aeration and filtration of the incoming liquid, and for the rapid efficient backwash of the filter beds as desired.

In the modification shown in FIGURE 8, components described above have been identified by the previously used numbers.

In the embodiment of FIGURE 8, the discharge conduit 80 is coupled to conduit 24, and the strainer unit 66 is fitted onto the latter conduit, so that the discharge filter liquid may be drawn into the conduit 80 through the conduit 24.

A top partition or baffle plate 200 is provided in the embodiment of FIGURE 8 to provide sufficient pressure for disposal of the backwash liquid during the backwash operation. Check valves 202 and 204 are provided in the baffle 200 to permit flow of the liquid down through the baffle but to prevent the backwash liquid from passing up through the baffle.

A chamber 206 is suspended from the lower side of the baffle 200, and the outlet of the chamber is coupled to the drain pipe 72. During the backwash operation, sufficient pressure builds up under the baffle 200 to cause the backwash liquid to enter the chamber 206 through strainers 210, and to be discharged through the drain.

While particular embodiments of the invention have been described, further modifications may be made. The following claims are intended to cover all such modifications which come within the scope of the invention.

What is claimed is:

1. Filtering apparatus for providing a high purity liquid by filtering impurities out of an incoming liquid, said apparatus including: a tank; a first filter bed in said tank; an intermediate partition extending across said tank for supporting said first filter bed; a second filter bed in said tank below said partition; an aerator unit in said tank above said first filter bed; first conduit means for introducing the liquid to be filtered into said aerator unit to flow therethrough and thence to said first filter bed, and to pass through said first filter bed; a second conduit disposed in said first filter bed; a third conduit coupled to said second conduit and extending through said partition; strainer inlets mounted on said second conduit for receiving the filtered liquid from said first filter bed and discharging the same through said partition to said second filter bed by way of said third conduit to pass through said second filter bed to the bottom of said tank; and means for removing the filtered liquid from the bottom of said tank.

2. The filtering apparatus defined in claim 1, and which includes a plurality of backwash nozzles on said second conduit to receive backwash liquid from below said partition by way of said third and second conduits.

3. The filtering apparatus defined in claim 1 and which includes a pump coupled to said first conduit means for introducing the liquid to be filtered to said aerator unit under pressure.

4. The filtering apparatus defined in claim 1, and which includes a pump coupled to said removing means to create a suction on the filtered liquid at the bottom of said tank.

5. The filtering apparatus defined in claim 1 and which includes a plurality of backwash nozzles disposed in said second filter bed, further conduit means for introducing a backwash liquid to said nozzles, and a valve in said first conduit means for selectively diverting the incoming liquid to be filtered to said backwash nozzles.

References Cited

UNITED STATES PATENTS

| | | | |
|---|---|---|---|
| 489,084 | 1/1893 | Morgan | 210—275 X |
| 648,105 | 4/1900 | Greer | 210—279 X |
| 737,415 | 8/1903 | Keane | 210—279 |
| 2,176,549 | 10/1939 | Smith | 210—203 X |

REUBEN FRIEDMAN, *Primary Examiner.*

J. L. DE CESARE, *Assistant Examiner.*

U.S. Cl. X.R.

210—220, 279